United States Patent [19]

Garrigan

[11] Patent Number: 4,892,063
[45] Date of Patent: Jan. 9, 1990

[54] LEASH FOR TWO OR MORE ANIMALS

[76] Inventor: Catherine M. Garrigan, 6111 Greeley Blvd., Springfield, Va. 22152

[21] Appl. No.: 742,643

[22] Filed: Jun. 10, 1985

Related U.S. Application Data

[63] Continuation of Ser. No. 556,125, Nov. 29, 1983, abandoned.

[51] Int. Cl.[4] .............................................. A01K 27/00
[52] U.S. Cl. ...................................................... 119/109
[58] Field of Search .................. 119/106, 109; 272/74, 272/75; 24/122.3, 129 D

[56] References Cited

U.S. PATENT DOCUMENTS

| | | | |
|---|---|---|---|
| 2,827,017 | 3/1958 | Ryan | 119/109 |
| 2,909,154 | 10/1959 | Thomas | 119/109 |
| 2,944,817 | 7/1960 | Stiller | 272/75 X |
| 3,120,403 | 2/1964 | Molzan et al. | 119/109 |
| 3,214,166 | 10/1965 | Gaudet | 119/109 |
| 3,332,398 | 7/1967 | Mintz | 119/109 |
| 3,517,931 | 6/1970 | Kalish | 272/75 |
| 3,752,127 | 8/1973 | Baker | 119/109 |
| 3,884,190 | 5/1975 | Gurrey | 119/109 |
| 4,177,985 | 12/1979 | Hlasnicek et al. | 272/75 |

OTHER PUBLICATIONS

*The Pet Dealer,* "Tandem Leash for Double Dog Duty"-–Aug. 1982.

*Primary Examiner*—Robert P. Swiatek
*Attorney, Agent, or Firm*—Banner, Birch, McKie & Beckett

[57] ABSTRACT

A leash which can be used to easily control pairs of animals. The leash includes at least one leash member with one snap fastener at each end of the leash member for attaching the leash member to a collar or some other attachment on the animal, and a flexible, yieldable, compressible handle slidably disposed on the leash member between said snap fasteners for adjustably gripping the leash member. This configuration allows for comfortable yet firm control of the animals as they move variably in distance relative to the walker and relative to each other while simultaneously allowing for controlled movement circumferentially or radially about the walker.

8 Claims, 1 Drawing Sheet

4,892,063

LEASH FOR TWO OR MORE ANIMALS

This is a continuation of co-pending application Ser. No. 556,125 filed on Nov. 29, 1983, and now abandoned.

BACKGROUND AND DISCUSSION OF THE INVENTION

It is well known that leashes have been used in walking dogs and other animals to hold, control, and otherwise secure the animal relative to the walker. However, when more than one animal is involved, typically a multitude of similar length leashes is employed. These leashes often either terminate at a single handle, or are split from a single leash member near the fastener members to form a "Y" shaped leash.

The "Y" shaped leash forces the animals to walk near each other which may not be convenient or practical when only one of the animals is defacating, urinating or seeking to explore an area not desired by its leashed mate. This can lead to consternation, altercation and general disharmony between the animals.

The leashes that terminate at a single handle suffer from other serious defects. The single handle leash allows both of the animals to move radially about the dog walker. Unfortunately, the walker will only be able to accurately control the distance between the lead animal and his or herself. The lead animal will tend to be the stronger or more aggressive animal. The other animal will not be similarly well controlled. Oftentimes the leash to the other animal will be slack, or in the alternative the lead animal may actually pull both the walker and other animal in its desire for more freedom. While the walker may wish to permit the lead animal extra leash, he is constrained by the length of the leash member.

These configurations create a situation which is often awkward for the walker and confusing or hazardous to the animals. This confusing loss of control by the walker tends to defeat the primary purpose of the leash, i.e. to control the animals effectively and efficiently.

The invention described herein relates to a unique leash system which permits a single handle to be employed for controlling more than one animal. The leash includes at least one leash member having one snap fastener means attached at each end of said leash member for fastening said leash to a collar or some other attachment on the animal. A handle means is slidably disposed about said leash member, and between said snap fastening members. The handle is formed in such a manner as to completely yet slidably encircle the leash member.

DETAILED DESCRIPTION OF THE PREFERRED EMBODIMENT

Figure 1:
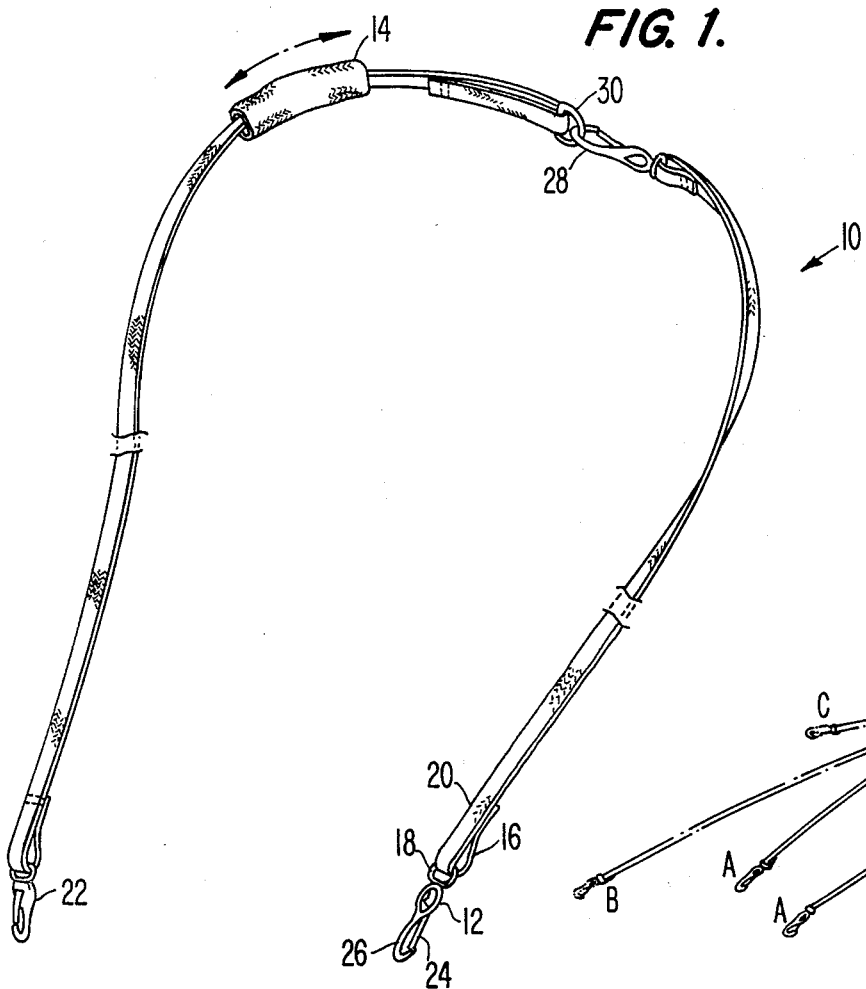
FIG. 1 is a perspective view of the invention showing a two-leash system.

As can be seen in FIG. 1, each end of the leash member (10) includes one fastener means (12) for releasably attaching the leash member to a collar or other complimentary securing means on an animal. A flexible, yieldable, compressible handle means (14) is slidably disposed about the leash (10) between said fastening means (12).

Each fastening means is secured to the leash (10) by means of the leash member being folded to form a loop portion (16). The leash member is first threaded through a completely enclosed ring (18) in one end of said fastening means, and then is attached to itself (20). A second fastening means (22) is similarly attached to the other end of said leash member.

A handle means (14) completely encloses a section of said leash member (10) and is slidably disposed between said snap fasteners (12 and 22).

The leash (10) may be assembled in a number of different manners. The preferred method of assembling the leash is by wrapping a flexible, yieldable, compressible material longitudinally around said leash member, sewing, glueing or otherwise rigidly fastening one longitudinal edge of said handle means to the other longitudinal edge of said handle means; and then turning the newly formed handle means inside out, so as to leave the sealed seam adjacent to the leash member.

Figure 2:
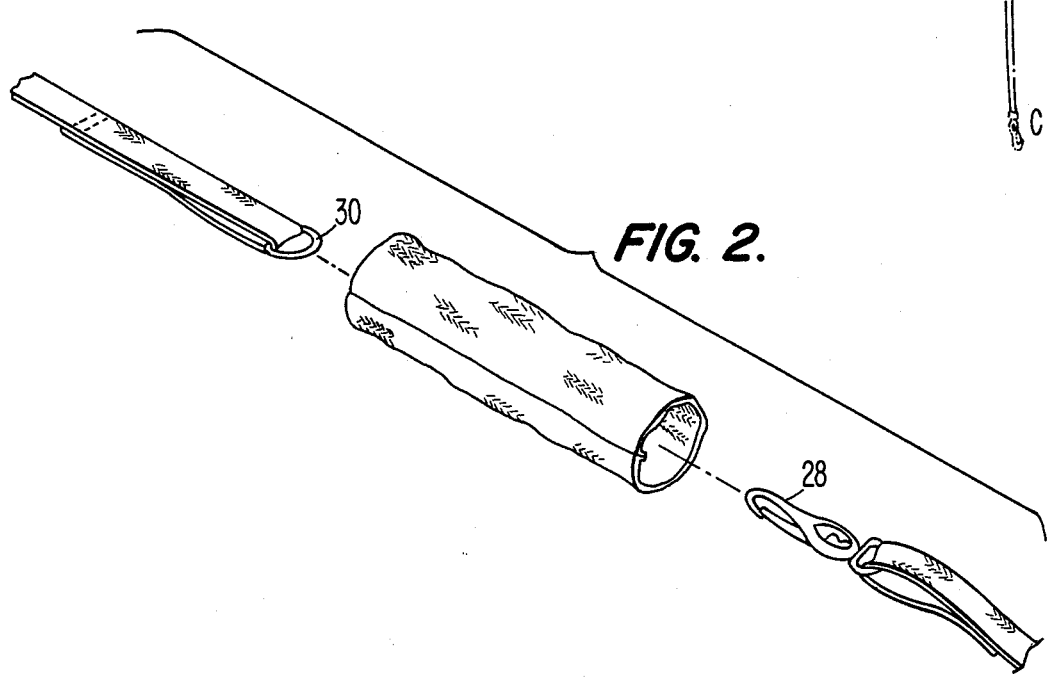
FIG. 2 is a perspective view showing alignment of the leash members prior to assembly.

A second method of assembling the leash is shown in FIG. 2. The handle means is formed apart from the leash member by folding the leash longitudinally, sewing, glueing, or otherwise rigidly fastening one longitudinal edge of said handle means to the other longitudinal edge of said handle means and then turning the newly formed handle means inside out. The central snap fastener (28) is separated from the central "D" ring. Then the central snap fastener (28) is threaded through the handle means (14) and is attached to the central "D" ring (30).

Alternatively, the central "D" ring (30) may be threaded through the handle (14) and is then attached to the central snap fastener (28).

It will be appreciated that the length of the handle means should be long enough to accommodate the average hand, usually 4 inches to 8 inches. The effective diameter of the handle means is smaller than the width of said snap fastening means so said handle means is effectively locked between said snap fastening means (12)(22).

In operation of the leash, the walker can control the movement of the leash member (10) through the handle means (14) by adjustably gripping the leash member through the handle means. When little compressive force is applied, the leash member is free to slide through the handle means. When a greater amount of compressive force is applied, the movement of the leash member through the handle means may be retarded, and possibly completely prevented.

Figure 3:
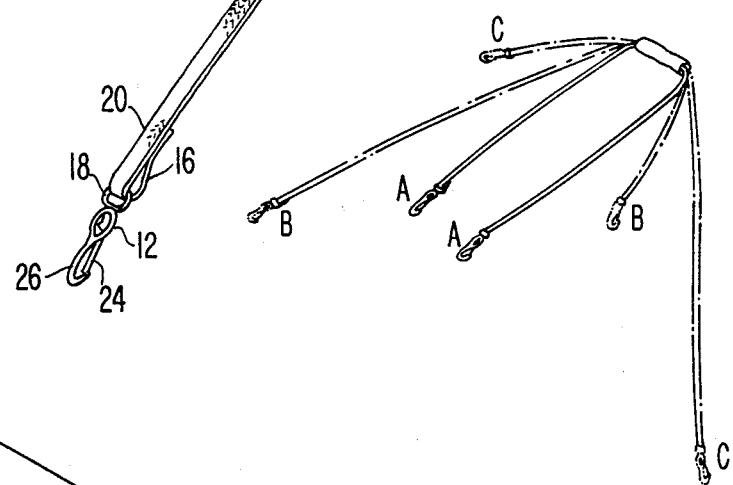
FIG. 3 shows an embodiment with three pairs of leash members.

In alternate embodiments a plurality of leash members may be threaded through the handle means, as is shown in FIG. 3. The handle means will have an effective diameter less than the effective cumulative diameter of the snap fasteners (12)(22) at either end of the leash members which will lock the handle means between the fasteners. The effective diameter of the handle means must also be large enough to permit the leash members to slide through the handle means independently when little compressive force is applied to the leash members through the handle means.

Each fastening means (12, 22) includes a snap element (24) and a hook means (26). The snap element (24) normally engages with the hook means (26) to form a completely closed loop area which will securely attach to a loop embedded in a collar or other animal accessory.

Each of the said snap fasteners (12 and 22) is secured to said enclosed ring (18) in a manner which permits them to rotate about an axis relative thereto. This minimizes twisting of the leash when it is secured to the animal.

It should be understood that in the embodiment discussed above, each handle means is primarily made of a fabric or woven material. However, leather or other flexible, compressible materials typically used for leashes can be employed.

Although the above has been a detailed description of the preferred embodiment, the Applicant intends to claim as its invention these elements as defined in the accompanying claims and substantial equivalents thereto.

What I claim is:

1. A leash for a pair of animals comprising:
   an elongated leash member having a first end and an opposite second end,
   a first releasable animal fastening means secured to said first end for fastening said first end to a first animal,
   a second releasable animal fastening means secured to said second end for fastening said second end to a second animal at the same time as said first end is fastened to the first animal, and
   a slidable compressible handle positioned between and slidable on said leash member toward and away from said first and second releasable animal fastening means, and having an opening passing therethrough through which said leash member passes,
   said slidable compressible handle being compressible between a first generally natural state where, when the user grasps said handle loosely, said handle slides freely between generally said first and second ends as the first and second animals when secured, respectively, to said first and second releasably fastening means generally move relative to said handle or to each other, and a second compressed state wherein, when the user grasps said handle firmly, said handle grasps said leash member and said handle is thereby held on said leash member in a position generally fixed relative to said first and second ends.

2. The leash of claim 1 including,
   said compressible handle being made from woven fabric.

3. The leash of claim 1 including,
   said compressible handle being made from leather.

4. The leash of claim 1 including,
   said compressible handle being between 4 and 8 inches.

5. The leash of claim 1 including,
   said compressible handle having a longitudinal interior seam.

6. The leash of claim 1 including,
   said slidable compressible handle being generally cylindrical and said opening passing therethrough being generally linear.

7. The leash of claim 1 including,
   said slidable compressible handle being slidable generally the entire length of said leash member.

8. The leash of claim 1 including,
   said leash member sliding relative to said opening of said compressible handle as the first and second animals when secured, respectively, to said first and second releasable animal fastening means move relative to said compressible handle.

* * * * *